United States Patent
Himmel et al.

(10) Patent No.: US 6,961,536 B2
(45) Date of Patent: Nov. 1, 2005

(54) RECEIVER CONTROL USING VEHICLE STATE CONDITIONS

(75) Inventors: Maria Azua Himmel, Yorktown Hts., NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 10/112,479

(22) Filed: Mar. 28, 2002

(65) Prior Publication Data

US 2003/0186662 A1 Oct. 2, 2003

(51) Int. Cl.[7] .................................................. H04H 1/00
(52) U.S. Cl. ................. 455/3.01; 455/185.5; 455/186.1
(58) Field of Search .............................. 455/3.01, 3.04, 455/152.1, 185.1, 161.1, 181.1, 184.1, 184.6, 166.2, 187.2, 456.1, 3.02, 186.1, 187.1, 188.1, 345, 194.1, 158.4; 701/36, 49

(56) References Cited

U.S. PATENT DOCUMENTS

| | | | | |
|---|---|---|---|---|
| 4,860,380 A | | 8/1989 | Mengel | 455/186.2 |
| 5,530,924 A | * | 6/1996 | Miller | 455/186.1 |
| 5,701,599 A | * | 12/1997 | Aihara | 455/186.1 |
| 5,745,845 A | * | 4/1998 | Suenaga et al. | 455/194.1 |
| 5,864,753 A | * | 1/1999 | Morita et al. | 455/186.1 |
| 6,011,854 A | * | 1/2000 | Van Ryzin | 381/77 |
| 6,037,933 A | | 3/2000 | Blonstein et al. | 345/721 |
| 6,697,607 B1 | * | 2/2004 | Smith et al. | 455/185.1 |
| 6,704,553 B1 | * | 3/2004 | Eubanks | 455/186.1 |
| 2003/0078709 A1 | * | 4/2003 | Yester et al. | 701/36 |
| 2004/0198217 A1 | * | 10/2004 | Lee et al. | 455/3.01 |

FOREIGN PATENT DOCUMENTS

| | | | | |
|---|---|---|---|---|
| JP | 1236826 | 9/1989 | | H04B/1/06 |
| JP | 8154038 | 11/1996 | | H03J/5/02 |
| JP | 8336079 | 12/1996 | | H04N/5/44 |
| JP | 11266406 | 9/1999 | | H04N/5/44 |

\* cited by examiner

*Primary Examiner*—Sonny Trinh
(74) *Attorney, Agent, or Firm*—Robert H. Frantz; Herman Rodriquez; Leslie Van Leeuwen

(57) ABSTRACT

A broadcast receiver which automatically tunes to a signal source depending on a set of rules and vehicle state conditions, such as seat occupancy, door sensors, time, day of the week, weather conditions, program content rating, vehicle location, user language preference, user identity and driver preferences. The user can configure a set of rules which causes the receiver to be automatically retuned in response to changes in conditions of the vehicle, such as favorites for the commute to work and favorites while driving with children. This eliminates the driver's distraction while operating the vehicle of searching for stations and routinely changing the station setting, thereby enhancing the usefulness, convenience, and safety of the vehicle broadcast receiver.

20 Claims, 4 Drawing Sheets

RECEIVER CONTROL USING VEHICLE STATE CONDITIONS

CROSS-REFERENCE TO RELATED APPLICATIONS (CLAIMING BENEFIT UNDER 35 U.S.C. 120)

This application is related to the U.S. applications docket numbers AUS9-2000-0531-US1 and AUS9-2000-0530-US1, filed on Oct. 12, 2000 and Nov. 3, 2000, now application Ser. Nos. 09/687,090, now U.S. Pat. 6,697,607, and Ser. No. 09/704,599, respectively, both by Newton James Smith, et al., which are commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent applications docket numbers AUS9-2000-0531-US1 and AUS9-2000-0530-US1, filed on Oct. 12, 2000 and Nov. 3, 2000, now application Ser. Nos. 09/687,090 and 09/704,599, respectively, both by Newton James Smith, et al., are incorporated herein by reference in their entireties, including drawings, and are hereby made a part of this application.

BACKGROUND OF THE INVENTION

1. Field of the Invention

This invention relates to the art of receivers of broadcast signals and data, such as traditional analog radio receivers, digital radio receivers, televisions, and wired and wireless web receivers. More specifically, this invention relates to automotive receivers which automatically tune themselves according to a user's preferences and the state indicators of the automobile.

2. Description of the Related Art

There are many types of broadcast receivers available in the art today, including radios, televisions, and wireless web receivers. With the advent of Internet broadcast video and broadcast radio channels such as Net Channels and Net Radio by Netscape, even a web browser connected to a wired network can be considered a broadcast receiver of sorts. Thus, not all broadcast receivers are necessarily wireless receivers, but in general it can be said that all broadcast receivers are of the nature that they receive and present information to a user in a unidirectional manner.

Turning to FIG. 1, the general architecture of a typical radio (10) is shown. A broadcast signal (1) is received by the radio (10) through an antenna (2). A tuner/receiver (3) decodes a signal from a selected frequency and band, and outputs that signal to an audio amplifier (7). In turn, the audio amplifier (7) produces a signal to drive a speaker (8), creating sound which is audible by a user. Most modern radios include a controller (4), such as a microprocessor or microcontroller, which may select a frequency and a band for the tuner/receiver (3) to decode. Indicators from the tuner/receiver (3) back to the controller may include station lock and stereo detected. The controller typically has associated with it a memory (4') for use by the firmware or software executed by the controller, and for storing user preferences such as the stations assigned to preset keys on the radio.

A typical radio also has a keypad (5), which can be monitored by the controller for user input, and a display (6), such as an alphanumeric LCD display, which can be driven by the controller. On the keypad there are typical preset keys such as preset 1 through preset 6. A typical radio will allow a user to assign a specific frequency or station to each key pad preset key. For example, preset key 1 may be assigned to the favorite radio station of a user, such that the user may quickly tune the radio to the favorite station by a single press of preset key 1. The controller stores this selection in a list in memory (4'). Most radios display the frequency of the currently selected station, or the time from a clock on the display (6).

More advanced radios include an information channel decoder (9) for services such as the Radio Broadcasting Data Service ("RBDS") for United States markets or Radio Data Service ("RDS") in European markets. In these services, an information channel is broadcast by the station on an inaudible modulated sub-carrier, or on a separate carrier signal. Certain data is provided within the information channel data stream, such as the station's call letters, a song title or artist name, and a broadcast content or "format tag" (e.g. classical, rock, news, jazz, talk, etc.). After this information is decoded, it may be used by the radio's controller for display to the user.

Some radios include a "weather band" which allows them to receive a weather-related broadcast such as the programs from the National Oceanic and Atmospheric Administration ("NOAA"). NOAA broadcasts two types of programs in most areas: an analog audio channel through which verbal weather conditions and forecasts are presented, and a digital system which includes a digital information channel (in addition to an audio channel) which contains county indicators and specific warnings and alerts (e.g. tornado warning, flash flood watches, freeze alerts, etc.)

Such radios are readily available from major manufacturers of radios such as Blaupunkt, Alpine, Panasonic, and others. Additionally, standard chip set or semiconductor solutions for implementing radio receivers such as these are available from well-known semiconductor manufacturers, including Philips Semiconductors.

Most receivers are provided with several preset keys in the keypad. They may also have a key that cycles through one or more banks of preset memories, such as three FM band preset banks and one AM band preset bank. For example with 6 preset keys, a user may configure the radio with up to eighteen favorite FM stations and six favorite AM stations. However, most users are unable to remember eighteen stations assigned to eighteen key selections, and thus the FM banks 2 and 3 may go practically unused.

Radio listeners often listen to the same radio stations under certain circumstances, particularly while in an automobile. For example, a user might listen to the weather report on one station, the traffic report on another, and the news on yet a third. Because these broadcasts occur during certain times of the day such as the drive in to work or drive home, the user may select these programs and broadcasts on a fairly regular timed basis on certain days, such as Monday through Friday.

It is a distraction to the driver to make these station changes while operating the vehicle, yet this routine takes place every morning as the user drives to work, and each evening when returning home.

Still more distracting is when the driver must deviate from his normal routine in listening, such as when the driver is transporting young children or a spouse. For example, a given male driver may prefer to listen to a sports talk station normally during the morning commute. When this male driver is tasked to drive the children to school, it may be undesirable to play such programming in the car as the language used in the show may be inappropriate for younger listeners. As such, during this particular drive, the driver must try to tune the radio to a more family-oriented broadcast using the radio's seek, scan or tune controls, which can be even more distracting than executing his routine station changes. A similar situation may occur when the driver is traveling with his spouse in the passenger seat, who may want to listen to a musical program instead of a sports talk show.

In the related patent applications, systems and methods for automatically turning on the radio and tuning it by content tags for the broadcasts were disclosed. While these are useful improvements in the art, they do not address this particular problem to its full extent.

Therefore, there is a need in the art for a system and method which is more convenient, useful, and safe particularly in an automobile, to automatically select broadcast stations and signal sources based on conditions and states of a vehicle, including the time of day, day of the week, occupancy of the vehicle (driver identity, lone driver, driver with front-seat passenger, driver with rear-seat passengers, etc.), location of the vehicle (downtown, highway, suburbs, etc.), and weather conditions. Further, there exists in the art a need for a method to establish such an automatic tuning sequence and a related rule set easily and conveniently. Ideally, the new system and method would include in its available resources not only broadcast stations and sources (e.g. web addresses, channels, etc.), but also locally provided signal sources such as a compact disc, digital versatile disc ("DVD"), MP3 memory, or cassette player.

BRIEF DESCRIPTION OF THE DRAWINGS

The following detailed description, when taken in conjunction with the figures presented herein, provides a complete disclosure of the invention.

SUMMARY OF THE INVENTION

The present invention enhances a broadcast receiver such as a radio, television, or web browser, such that it may automatically tune to a signal source depending on a set of rules and current vehicle conditions, such as vehicle seat occupancy, door sensors, time, day of the week, program content rating, vehicle location, weather conditions, driver identity, user preferences, interior and exterior lights ON/OFF status, vehicle speed, changes in speed, windshield wiper ON/OFF status, air conditioning and heat settings, and air bag deployment status.

The user can configure a set of rules which causes the receiver to be automatically retuned in response to changes in conditions of the vehicle, such as favorites for the commute to work, acceptable programming content while driving with children (rear seat occupied), and preferred stations and program content when traveling with a spouse (front passenger seat occupied). Multiple rule sets are provided for multiple drivers, as well.

Use of the invention eliminates a driver's distraction searching for stations and routinely changing the station setting, thereby enhancing the usefulness, convenience, and safety of the vehicle broadcast receiver.

DETAILED DESCRIPTION OF THE INVENTION

The system and method are preferably realized as firmware functions in combination with a processor-controlled standard broadcast receiver. For example, several semiconductor manufacturers offer radio chipsets which are capable of receiving and decoding channels from broadcast radio and television stations. These self-tuning receiver chipsets are typically provided in the form of a microcontroller, associated firmware, and receiver peripheral components for radio reception, television or cable reception, etc.

Figure 1:
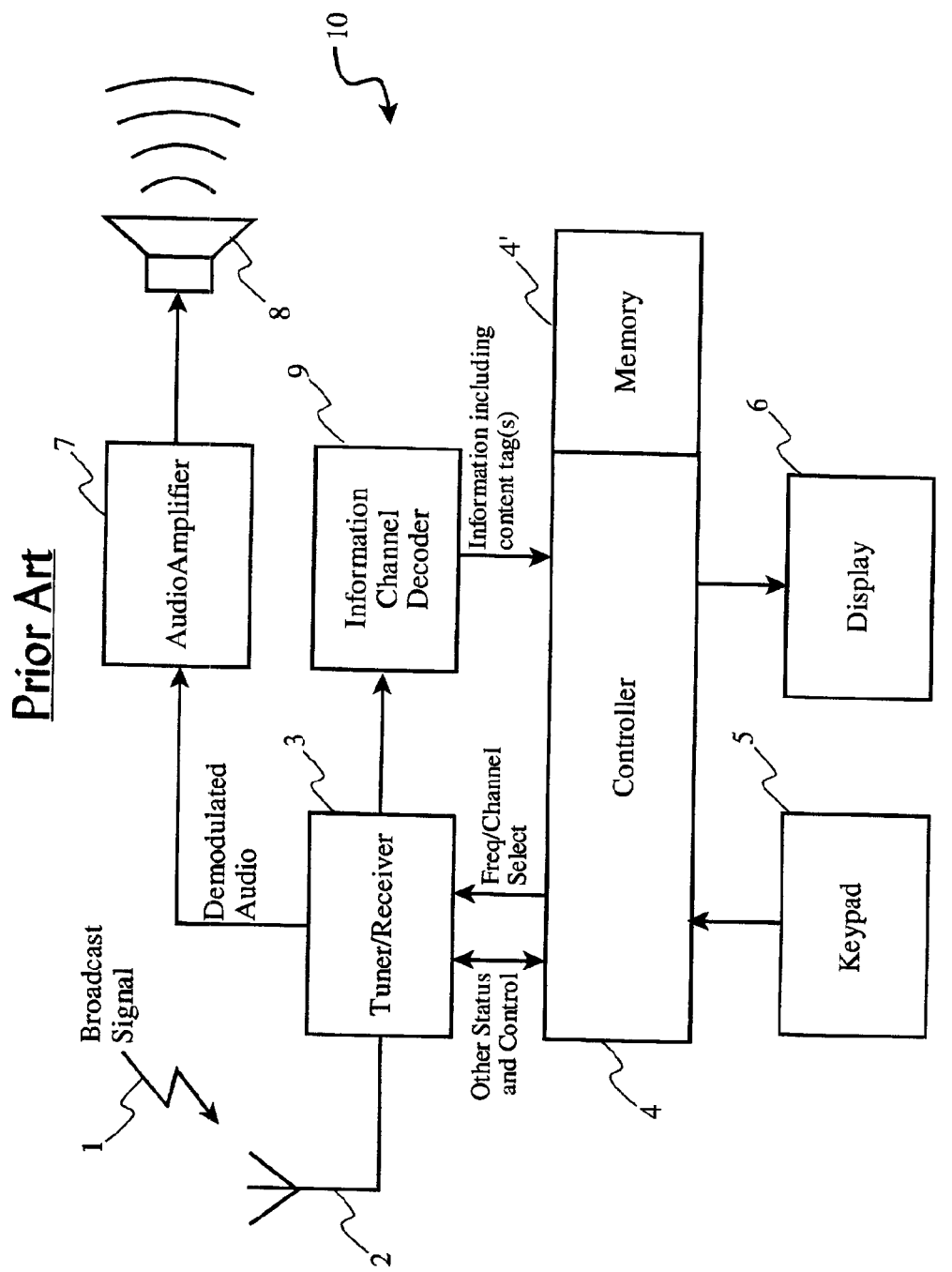
FIG. 1 shows the generalized architecture of a typical radio broadcast receiver.

In such an embodiment, the system and method may be realized through enhancements and modifications to existing firmware which controls the receiver, such as a radio having a general architecture as shown in FIG. 1. Chipset solutions for the tuner/receiver, information channel decoder (RDS, RBDS, weather, etc.), and audio amplifier, keypad and display are also well-known within the art.

Alternate implementations for other types of broadcast receivers are available depending on the type of broadcast to be received. For example, the system and method may be implemented as software within a web browser, Java code, or browser plug-in, for the receipt of web broadcast information. Or, it may be implemented as software or firmware changes or enhancements to the controller software within a television for the receipt of television broadcasts with preferred formats. Firmware within handheld personal digital assistants ("PDA") and wireless web telephones may also be modified to realize the invention.

As such, the preferred embodiment disclosed herein is given relative to a broadcast radio receiver. However, it will be recognized by those skilled in the art that the system and method are not constrained to implementation in just a radio system, and may also be implemented in other types of broadcast receivers such as televisions, Internet broadcast receivers, and various wired and wireless receivers.

By using the invention, a driver may configure a set of rules by which the receiver will automatically tune itself based upon current conditions and states of the vehicle. For example, on the weekend, the driver may listen to sports on one station, the "Prairie Home Companion" variety show on another station, etc. The driver might also want to select the classical music station when the passenger door opens, knowing that this will usually be his wife and that she likes classical music. Further, the user may select stations to be tuned based upon the vehicle's current location using a global positioning systems ("GPS"), or mobile telephone, for example, tuning to traffic reports for longer periods of time when driving downtown. Furthermore, this schedule may depend upon who is driving the automobile, custom set similarly to the vehicle seat and mirror positions.

Hardware Platform

Reviewing FIG. 1, a controller (4) with memory (4') is interfaced to a keypad (5) and a display (6). The keypad (5) may include an UP or DOWN, scan or seek keys, and a number of preset station keys. The display may be one of several types which are well-known in the art, such as an alphanumeric LCD or LED display. The controller is provided with control outputs to the tuner/receiver (3), which allow the controller to select a frequency and a band for the tuner/receiver (3) to demodulate. In return, the tuner/receiver (3) provides certain indications to the controller (4), such as station lock or station found, stereo detected, and information channel detected. The tuner/receiver has a means for receiving the broadcast signal (1), such as an antenna (2) or a wired connection. The tuner/receiver (3) has an output for the decoded broadcast content, such as music or other signal. In a radio, an audio amplifier (7) is provided to receive this demodulated signal output from the tuner/receiver (3) and to drive a speaker (8).

Also in the preferred embodiment, a means for decoding the information channel in the selected broadcast signal is provided (9). This may be a device such as the Philips' SAA6579 Radio Data System Demodulator and SAA6588 RDS/RBDS preprocessor device, it may be a weather information decoder device, or both.

Alternatively, this information channel decoder means may be adapted or selected from available technologies depending on the type of broadcast being received. For example, if the invention is being realized to decode television broadcast format tags, an appropriate chipset or firmware module which is compatible with the television broadcast standard or protocol may be employed in its place.

Figure 2:
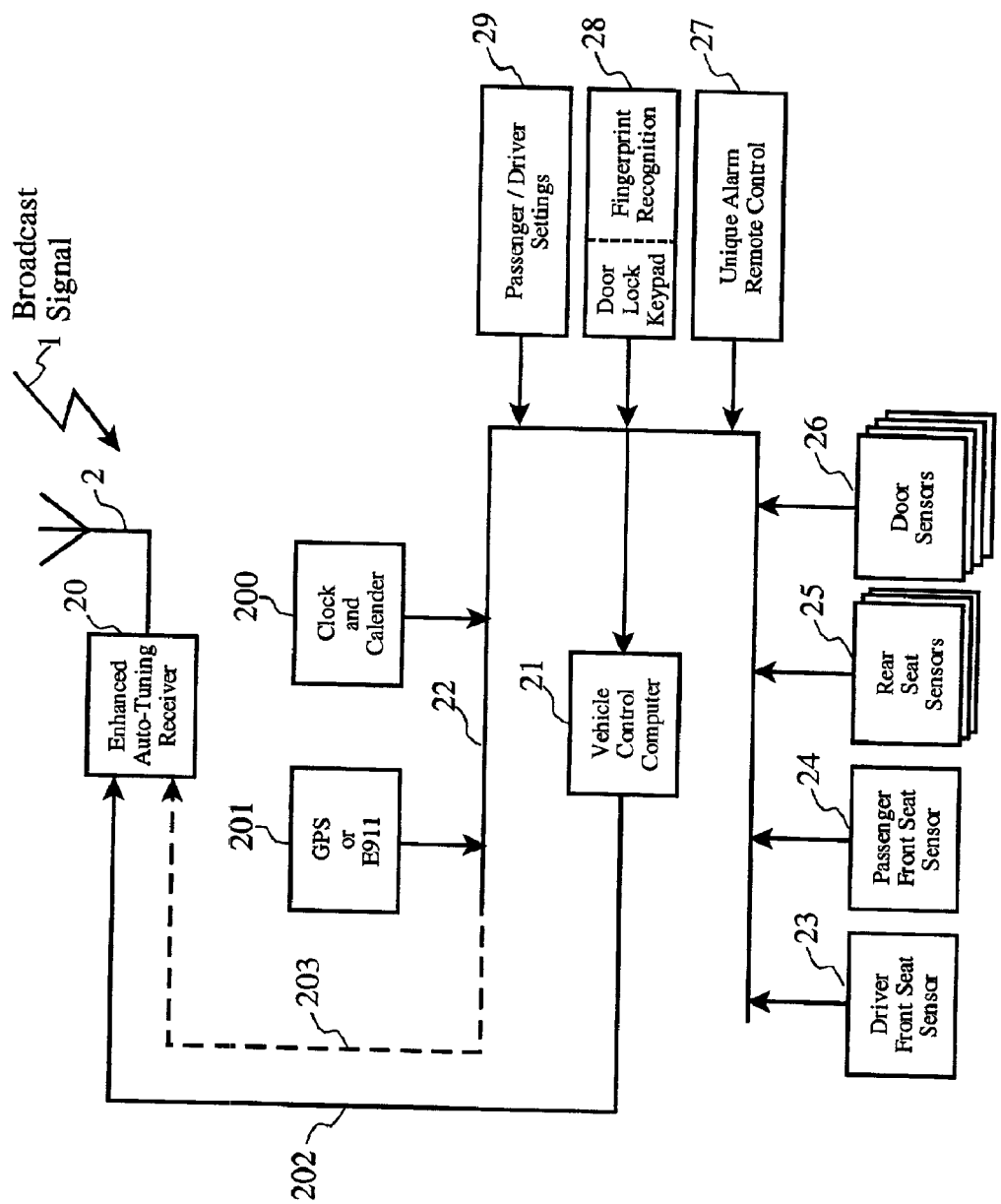
FIG. 2 presents the interrelationships among common vehicle components, instruments and sensors, with the enhanced automatic tuning receiver according to the present invention.

Turning to FIG. 2, the enhanced receiver (20) is interfaced to a number of vehicle systems, signals and sensors, as shown. Most vehicles are equipped with sensors in the front and rear seats (23, 24, 25) which can be read by the vehicle's control computer (21) in order to illuminate a "fasten seat belts" indicator and/or chime if a seat is occupied but a seat belt is not fastened. In certain vehicle models, seats which are protected by supplemental restraint systems ("SRS") or "airbags" have enhanced sensors which provide some indication to the vehicle control computer (21) of the weight of a seat occupant, so that multistage airbags may be controlled appropriately. Additionally, most vehicles are equipped with door sensors (26) which are used by the vehicle control computer (21) for safety and alarm purposes.

Some vehicles have additional sensors to support other features of the vehicle, such as wireless receivers or infrared receivers for receiving codes from alarm and keyless entry fobs (27). Many of these types of remote entry controllers have unique identifiers, and as such, may be associated with a particular driver. Some luxury vehicles will use this input as a means to identify the driver and to implement certain driver preferences, such a mirror positions, driver seat adjustments, and pedal positions (29). In some vehicles, these driver preferences may also be recalled by operation of other user controls, such as buttons on the dashboard.

Additionally, some vehicles are equipped with keyless entry keypads (28) on the doors which allow a user to enter a combination code to unlock the vehicle and to disable the alarm system. In some cases, unique combinations can be assigned to each driver, which also may be used as an indicator of which set of user preferences and tuning rules to recall. Recently, with the advent of semiconductors which recognize and identify fingerprints, some automobile manufacturers have announced plans to identify drivers and lock/unlock a vehicle based upon fingerprints in addition to or as a replacement for numeric keypads and metal keys.

Most vehicles also are equipped with a real-time clock and calendar (200), which not only can be displayed to the driver, but can also be used by the firmware of the vehicle control computer (21) to determine driving habits and maintenance schedules.

For vehicles which are equipped with GPS capabilities (201), the vehicle position information may be received by the enhanced receiver (20) as another vehicle state condition. It is anticipated that the emerging Enhanced 911 ("E911") mobile telephone initiative from the Federal Communications Commission may also provide a vehicle position indication, either to the vehicle control computer (21) or directly to the enhanced receiver (20).

As such, all of these signals can be viewed as a set of vehicle state conditions (22), upon which certain decisions and actions are taken by the vehicle control computer (21). According to the present invention, these state conditions (22) are also provided to the enhanced receiver (20), either directly (203) by way of wiring harnesses or computer bus, or indirectly (202) as data or signals from the vehicle control computer (21) which could be modified to act as a proxy or collector of these signals on behalf of the enhanced receiver (20).

It will be recognized by those skilled in the art that in order to realize the present invention, it is not critical that all of the listed signals be present in the vehicle, nor is it critical that all possible condition indicators be anticipated in this disclosure. According to the present invention and preferred embodiment, any and all available vehicle state condition indicators are provided to the enhanced receiver (20) to the extent they are relevant to a user's tuning preferences.

The remainder of the disclosure of the invention relates to methods which may be implemented as firmware or software changes for the controller within the enhanced receiver (20).

Tuning According to a Rules Base

First, we focus our attention on the operation of the receiver (20) based upon an established rules base taking into account the vehicle state conditions, assuming the rules base has already been created by a user or on behalf of a user. How to create such a rules base will be disclosed later in this specification.

Table 1 shows a sample rules base for tuning a radio, which may be stored in any appropriate computer readable medium such as random access memory ("RAM"), Flash memory ("Flash ROM"), hard disk drives, etc.

TABLE 1

Example Rules Base tuning_rules(driver=1)
   default=preset_1
   (7:00a < time < 9:00a) AND (day = [m,t,w,r,f]) AND
      NOT(rear_seat=occupied) AND
      NOT(passenger_seat=occupied) tune(preset_4);
   (7:00a < time < 9:00a) AND (day = [m,t,w,r,f]) AND
      (rear_seat=occupied) tune(content=family);
   (day = [sat,sun]) tune(content=news OR sports);
end_tuning_rules(driver=1)
tuning_rules(driver=2)
   default=preset_6
   (day = [m,t,w,r,f]) tune(content=news);
   (day = [sat,sun]) tune(CD_4);
end_tuning_rules(driver=2)

In the first set of rules, defined from a starting tag for a first driver through an ending tag, sets of conditions are specified with a tuning selection for each set of conditions. For example, the first rule for the first driver (driver=1) causes the receiver to be tuned to preset station #1 if none of the other condition sets are met. The second rule causes the receiver to be tuned to the station for preset #4 on weekdays during the commute times, but only if the passenger seat and the rear seats are unoccupied. In the third rule, if the rear seats are occupied during the weekday commute time frames, such as the special case of the first driver taking his or her children to school, the receiver is caused to tune to a broadcast which has "family" rated content. The fourth rule causes the receiver on weekends to be tuned to any broadcast which has a "news" rating or a "sports" rating, regardless of the time of day or seat occupancy conditions.

The second set of rules is used when a second driver (driver=2) is operating the vehicle. Again, the first rule in this set of rules causes the receiver (20) to be tuned to the station programmed into preset #6 if no other condition sets are met. The second rule causes the receiver (20) to be tuned to a broadcast having a content rated as "news" during any time on a weekday, and the third rule commands the receiver (20) to play CD #4 in the CD changer on the weekends.

This particular syntax is quick to evaluate, and provides for a infinite number of rules and condition evaluation for an infinite number of drivers. The rules themselves may be stored in binary, text, or other useful format in the memory of the enhanced receiver. Alternate syntax may be adopted as well, and more sophisticated embodiments such as portable scripts may be employed. The rules may be created locally using the radio, such as by use of a menu system, or may be imported or downloaded from other sources, as will be described in more detail later.

Figure 3:
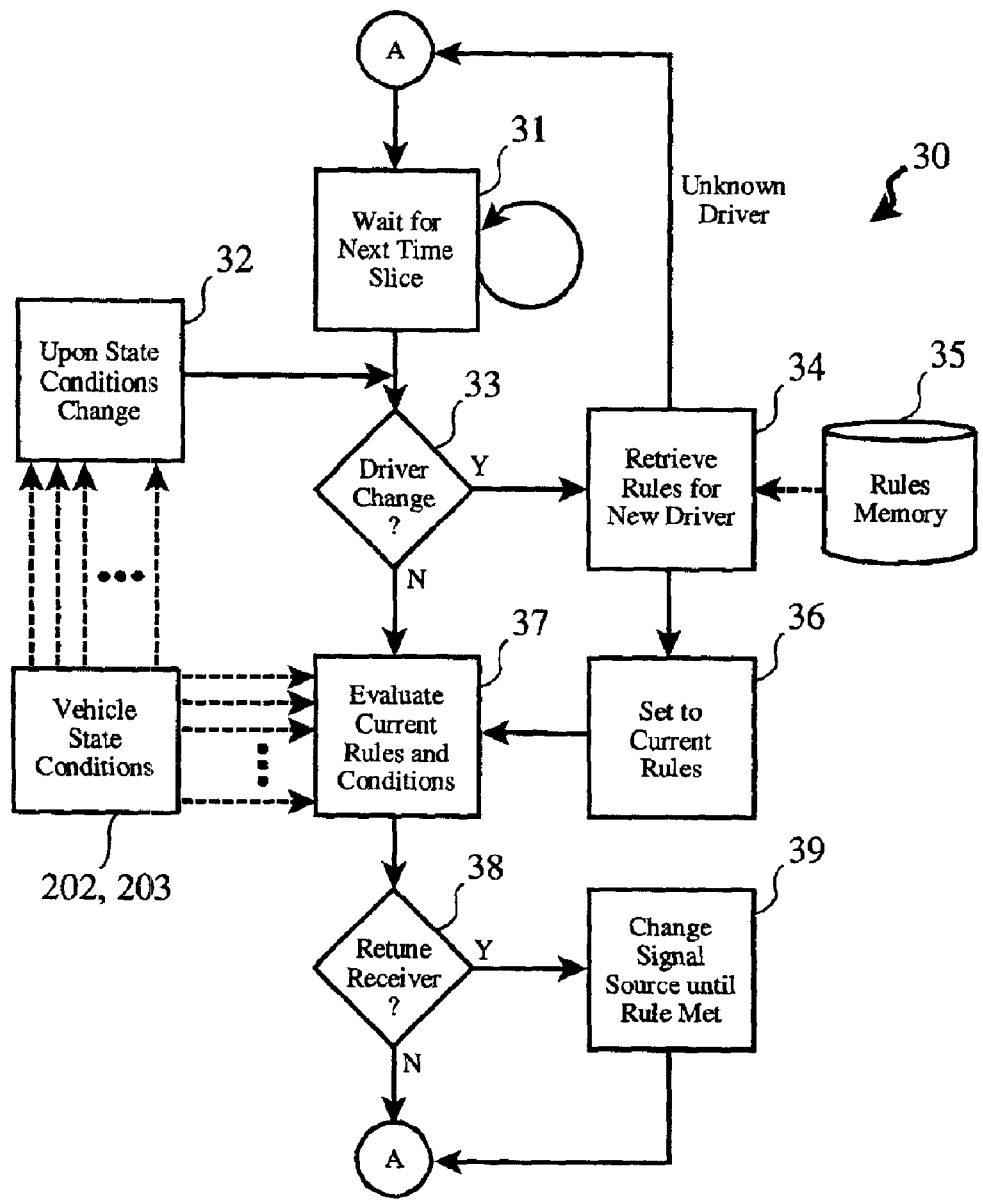
FIG. 3 sets forth the logical process of the invention.

Turning now to FIG. 3, the logical process (30) followed by the microcontroller of the receiver is shown in more detail. A timed-loop or scheduled process may be employed (31), wherein the rules and vehicle state conditions are evaluated periodically such as every few seconds. Alternately, an "event driven" approach may be taken, wherein any time a monitored vehicle state condition (202, 203) changes (32), the rules evaluation process is triggered.

Initially upon evaluation or reevaluation of the rules, a check is made (33) to see if a new driver is present. This can be done using a number of available signals and conditions from the vehicle, including but not limited to, the driver's settings selection, the unique remote entry code, or even a manually operated key or switch on the receiver's keypad or the vehicle's dashboard. If a new driver is detected, the rules for that driver are retrieved (34) from the tuning rules memory (35). In some cases, the driver may be unknown to the receiver, in which case the current tuning setting may be left in place (the unknown driver may manually retune the receiver if desired).

However, if the driver is recognized, his or her rules are adopted (36) as the current rule set, and they are evaluated (37) against the current vehicle state conditions (202, 203). For example, driver 2 may have just entered the driver's seat and the current time may be 4:22 PM on a Tuesday. According to the example set of rules in Table 1, the desired broadcast content for this driver under these conditions is "news". So, a check (38) would be made to see if the currently received program has a content rating of "news", and if not, the receiver would be retuned until the rule (content=news) is met, such as by first scanning all preset stations followed by scanning all available stations. After the retuning is complete, the receiver returns to waiting for the next scheduled evaluation (31) or change in the vehicle state conditions (32). Preferably, though, if it is determined (38) that the currently received broadcast meets the rule, no retuning would be performed to avoid possible interruption of reception by retuning to the same station or signal source.

If when the retuning process (30) is performed it is determined (33) that the current driver is the same as the driver upon the previous evaluation, the current vehicle state conditions are reevaluated (37) against the existing set of rules, and retuning (39) is performed if necessary (38).

Establishing a Rules Base

According to the preferred embodiment, the rules base contains rule sets associated with individual drivers. In a simplified embodiment, a single rule set may be established, just as well.

Figure 4:
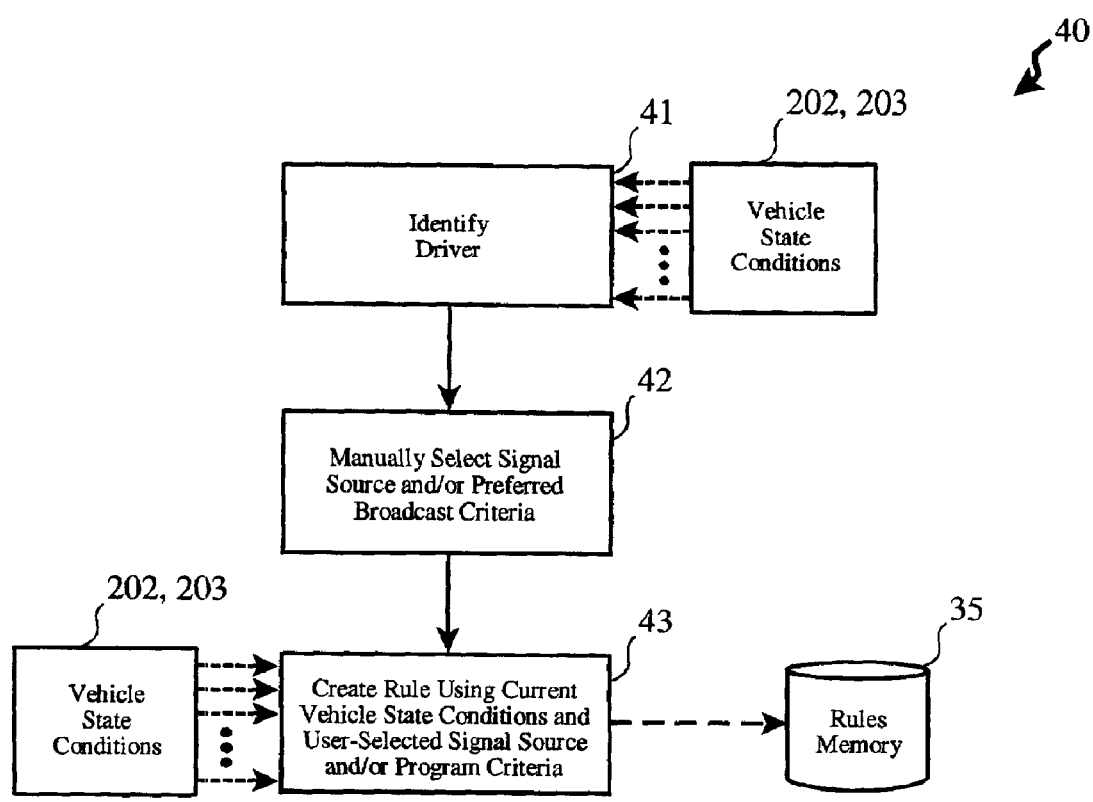
FIG. 4 provides a basic logical process for establishing an automatic tuning rules set.

An example logical process (40) for establishing a rules base is shown in FIG. 4, wherein the user is first identified (41) (e.g. by door code, key fob code, driver preferences settings, etc.), the user tunes the radio to a preferred station or indicates a content preference (42), and the receiver creates (43) or updates a rule for tuning to the preferred station or content based upon meeting conditions which are currently present in the vehicle (e.g. seat occupancy, time, calendar, etc.)

For example, assume that a first driver already has a receiver tuned to a particular station on preset #1, where he listens to sports talk radio. Then, on an initial Saturday morning, he drives his children for a first time to soccer practice, departing from their house at 9:00 AM. They arrive at the soccer field at 9:22, at which time the children get out of the car, and he then retunes the radio to his favorite sports talk radio station on preset #1, and drives to his morning golf game.

According to the preferred embodiment and this example, when the kids have just entered the car at 9:00 AM, he may manually retune the radio to any program rated "family", and then command the receiver to memorize or "learn" this rule. The receiver would sample the vehicle state conditions, note the time (9:00 AM) and the condition of the rear seats as being occupied, and may create a rule for the first driver (driver=1) as follows:

(9:00a<time) AND (day=[sat]) AND (rear_seat=occupied) tune-(content=family);

Then, at 9:22 AM, when he retunes the radio after the children exit the car, the receiver again samples the vehicle state conditions and creates an additional rule:

(9:22a<time) AND (day=[sat]) AND NOT(rear_seat=occupied) tune(preset_1);

On the next Saturday, during the first rule analysis on or after 9:00 am, if the back seats are occupied, the first rule will automatically cause the receiver to be retuned to a family program. Then, after 9:22 AM and when the rear seats are empty, the receiver will be automatically retuned to preset #1. As such, if regular Saturday morning drive to the soccer field takes a bit longer than usual, the second rule will not be enacted until the rear seats are empty.

Other, more advanced methods of establishing a rules base may be employed. A first such alternate method would be to allow the user to operate keys and buttons on the receiver's keypad to identify himself or herself, review, create and edit rules. Some luxury vehicles are equipped with in-dash touch screen displays for control of other system features (navigation, diagnostics, etc.), which may be provided with a control screen or set of screens for configuring and maintaining a rules base via interaction with the vehicle control computer.

Another alternate method for establishing and maintaining a rules base would be to allow the use of a web browser and a web site to build a rules set graphically and to download the rules set into the radio. The downloading process could be done by broadcasting them from a signal source (e.g. radio station or satellite channel) addressed to the specific receiver, by wireless transfer from a laptop, mobile telephone or PDA using infrared data arrangement ("IrDA") or Blue Tooth wireless communications, or even by "burning" the rules base onto a compact disc which then can be read by the receiver's CD player.

An even more advanced method for establishing and maintaining a rules base would be to use voice command recognition, which is already employed by some high-end vehicle computers and entertainment systems. Accordingly, for radios equipped with multi-lingual voice recognition capabilities, certain vehicle state conditions could be used to select the recognition language, as well. For example, a radio may be provided with Spanish and English capabilities. A first driver could define a rule to set the recognition language to English, while a second driver could set a rule to use Spanish voice recognition. Then, the other means described for identifying the driver (door code, key fob code, seat settings, time, etc.) can be used to automatically select the language of the voice recognition functions.

Signal Sources

In the preferred embodiment the signal source may be one of many available technologies such as broadcast stations, broadcast channels, stations based upon content tags as described in the related applications, web channels, web sites, or prerecorded media such as tape, compact disc, or computer readable memory (flash memory, NVRAM, ROM, etc.). Additionally, the enhanced receiver (20) may be configured to automatically play a section of content from a tape, compact disc, or portion of memory (4') within the radio (e.g. a downloaded MP3 file).

CONCLUSION

A system and method for automatically tuning a receiver to a signal source based upon current state conditions of a vehicle has been disclosed, including certain details of a preferred embodiment and illustrative examples.

The invention may be applied to radio receivers, as in the example embodiments, or may be applied to other types of broadcast receivers such as televisions, and wired and wireless web browsers, by employing available state conditions in the relevant environment. For example, the state conditions for a web browser receiving Internet broadcast channels could be used in the rules set, including log-in name (user identity), time and day of the week, etc. Other examples of uses of other state conditions for automatic tuning include:

(a) automatically tuning to a weather broadcast when windshield wipers are turned ON, or when the headlights are turned ON during normal daylight hours;

(b) setting digital weather broadcast preferences to surrounding counties based upon the vehicle's current location as indicated by GPS to enable automatic reception of important weather broadcasts while traveling out of a home area;

(c) tuning to traffic broadcasts when the speed of the vehicle abruptly changes from a relatively high rate of speed to a low rate of speed during rush hours;

(d) turning the radio to family programming if a child restraint seat is installed or occupied;

(e) turning OFF the radio if a vehicle's air bags are deployed; and (f) using air conditioning, heating, and interior light status as conditional considerations for the rules.

The signal sources which are automatically tuned may be of many types including, but not limited to, radio and television broadcast stations, Internet audio and video broadcast sources, radio/television/Internet channels based upon content, and prerecorded media such as tapes, CDs, or computer readable memory.

It will be understood from the foregoing description that various modifications and changes may be made in the preferred embodiment of the present invention without departing from its spirit and scope. It is intended that this description is for purposes of illustration only and should not be construed in a limiting sense. The scope of this invention should be defined by the following claims.

What is claimed is:

1. A method for controlling a broadcast receiver, said method comprising the steps of:

providing to a vehicle-mounted broadcast receiver a set of user-configured logical rules which specify a signal source to be received under a set of given conditions;

evaluating by said broadcast receiver said set of logical rules, one or more current broadcast receiver conditions, and one or more current vehicle state conditions, said broadcast receiver conditions indicating a physical condition of said broadcast receiver receiver position, and said vehicle state conditions indicating an operational status of a vehicle besides location;

retuning said broadcast receiver to a signal source which is specified in a one of said logical rules that matches said broadcast receiver conditions and said vehicle state conditions; and repeating said steps of evaluating current conditions and said logical rules, and retuning said broadcast receiver accordingly, said repetition being performed upon a basis selected from the group of periodic timing basis, responsive to detection of a change in a vehicle operational state condition, and responsive to detection of a change in a broadcast receiver condition.

2. The method as set forth in claim 1 wherein said step of providing a set of rules comprises providing a user indication for which one or more rules apply, and wherein said step of evaluating said set of rules comprises evaluating only rules for which a certain user indication is matched.

3. The method as set forth in claim 1 wherein said step of providing a set of rules comprises providing one or more vehicle interior state conditions.

4. The method as set forth in claim 3 wherein said vehicle interior state conditions comprises a state condition selected from the group of vehicle seat occupancy, vehicle door status, vehicle air conditioning settings, vehicle heating settings, and vehicle interior light status.

5. The method as set forth in claim 1 wherein said step of retuning the receiver to a signal source comprises causing the receiver to select a signal source from the group of a radio broadcast, a television broadcast, an Internet audio content provider, an Internet content video provider, or a section of content from a computer readable media.

6. The method as set forth in claim 1 wherein said step of providing a set of rules comprises providing one or more vehicular operational state conditions selected from the group of user-configured time value, user-configured day of the week value, weather conditions, vehicle exterior light status, rate of vehicle speed, and change in the rate of vehicle speed.

7. The method as set forth in claim 1 wherein said step of providing a set of rules comprises providing one or more user-operator state conditions selected from the group of broadcast content indicators as decoded from an information channel, user language preference, and user identity.

8. A computer readable medium encoded with software for controlling a broadcast receiver, said software causing a receiver control processor to perform the steps of:

providing to a vehicle-mounted broadcast receiver a set of user-configured auto-tuning logical rules, each logical rule having a preferred signal source indication to be received under a set of current conditions, said current conditions indicating at least one broadcast receiver condition besides receiver position and at least one vehicle operational state condition besides vehicle location;

receiving one are more current broadcast receiver conditions and one or more current vehicle operational state conditions;

evaluating said set of auto-tuning logical rules and received current conditions;

retuning said receiver to a signal source which is specified in a rule that matches said current broadcast receiver conditions and said current vehicle operational state conditions; and repeating said steps of evaluating current conditions and said logical rules, and retuning said broadcast receiver accordingly, said repetition being performed upon a basis selected from the group of periodic timing basis, responsive to detection of a change in a vehicle operational state condition, and responsive to detection of a change in a broadcast receiver condition.

9. The computer readable medium as set forth in claim 8 wherein said software for providing a set of auto-tuning rules comprises software for providing a user indication for which one or more rules apply, and wherein said software for evaluating said set of auto-tuning rules comprises software for evaluating only rules for which a certain user indication is matched.

10. The computer readable medium as set forth in claim 8 wherein said software for providing a set of auto-tuning rules comprises software for providing one or more vehicle interior state conditions selected from the group of vehicle seat occupancy, vehicle door status, vehicle air conditioning settings, vehicle heating settings, and vehicle interior light status.

11. The computer readable medium as set forth in claim 8 wherein said software for retuning the receiver to a signal source comprises software for causing the receiver to select a signal source from the group of a radio broadcast, a television broadcast, an Internet audio content provider, an Internet video content provider, or a section of content from a computer readable media.

12. The computer readable medium as set forth in claim 8 wherein said software for providing a set of auto-tuning rules comprises software for providing one or more vehicular operational state conditions selected from the group of user-configured time value, user-configured day of the week value, weather conditions, vehicle exterior light status, rate of vehicle speed, and change in the rate of vehicle speed.

13. The computer readable medium as set forth in claim 8 wherein said software for providing a set of auto-tuning rules comprises software for providing one or more user-operator state conditions selected from the group of broadcast content indicators as decoded from an information channel, user language preference, and user identity.

14. An enhanced vehicle broadcast receiver comprising:

a vehicle-mounted broadcast receiver tuner capable of receiving broadcast signals from a plurality of signal sources;

a processor for controlling said tuner, said processor receiving a one or more of current vehicle operational state conditions besides vehicle location, and receiving one or more current broadcast receiver conditions besides broadcast receiver position;

a set of user-configured automatic tuning logical rules accessible by said processor, said logical rules specifying which signal source is to be received by said broadcast receiver under a set of given broadcast receiver conditions and vehicle operational state conditions; and a controller for repeatedly evaluating said set of automatic tuning rules and said current broadcast receiver and vehicle operational state conditions, and for repeatedly retuning said receiver to receive a signal source specified by a rule which matches said vehicle state conditions, said repetition of evaluation and returning being performed upon a basis selected from the group of periodic timing basis, responsive to detection of a change in a vehicle operational state condition, and responsive to detection of a change in a broadcast receiver condition.

15. The broadcast receiver as set forth in claim 14 wherein said set of automatic tuning rules comprises a user indication for which one or more rules apply, and wherein said control program is adapted to selectively evaluate only rules for which a certain user indication is matched.

16. The broadcast receiver as set forth in claim 14 wherein said set of automatic tuning rules comprises one or more vehicle interior state conditions.

17. The broadcast receiver as set forth in claim 16 wherein said vehicle interior state conditions comprise a state condition selected from the group of vehicle seat occupancy, vehicle door status, vehicle air conditioning settings, vehicle heating settings, and vehicle interior light status.

18. The broadcast receiver as set forth in claim 14 wherein said set of automatic tuning rules specifies a signal source selected from the group of a radio station, a television station, an Internet audio content provider, an Internet video content provider, or a section of content from a computer readable media.

19. The broadcast receiver as set forth in claim 14 said set of automatic tuning rules comprises one or more vehicular operational state conditions selected from the group of user-configured time value, user-configured day of the week value, weather conditions, vehicle exterior light status, rate of vehicle speed, and change in the rate of vehicle speed.

20. The broadcast receiver as set forth in claim 14 wherein said set of automatic tuning rules comprises one or more user-operator state conditions selected from the group of broadcast content indicators as decoded from an information channel, user language preference, and user identity.

* * * * *

UNITED STATES PATENT AND TRADEMARK OFFICE
CERTIFICATE OF CORRECTION

PATENT NO. : 6,961,536 B2
DATED : November 1, 2005
INVENTOR(S) : Himmel et al.

It is certified that error appears in the above-identified patent and that said Letters Patent is hereby corrected as shown below:

Title page,
Item [74], *Attorney, Agent, or Firm,* change "Rodriquez" to -- Rodriguez --.

Signed and Sealed this

Tenth Day of January, 2006

JON W. DUDAS
*Director of the United States Patent and Trademark Office*